Nov. 7, 1944.   C. AMBRUSTER   2,362,335
VENT STRUCTURE FOR STORAGE BATTERIES
Original Filed June 26, 1940
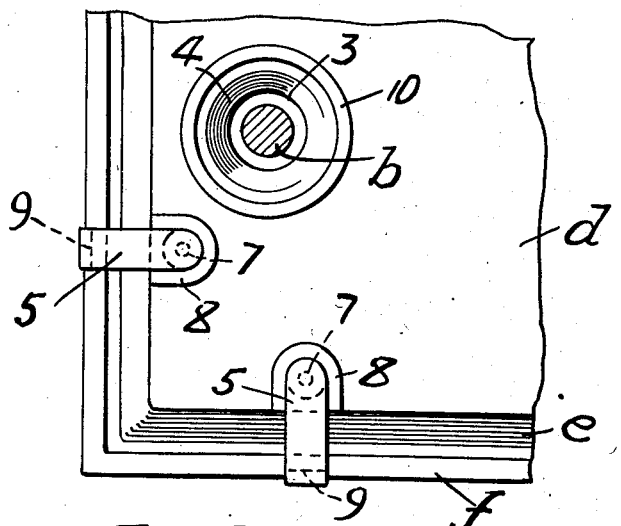
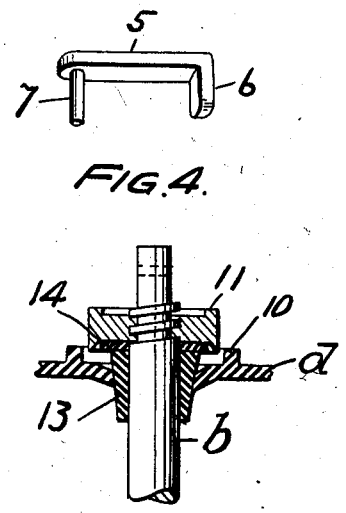
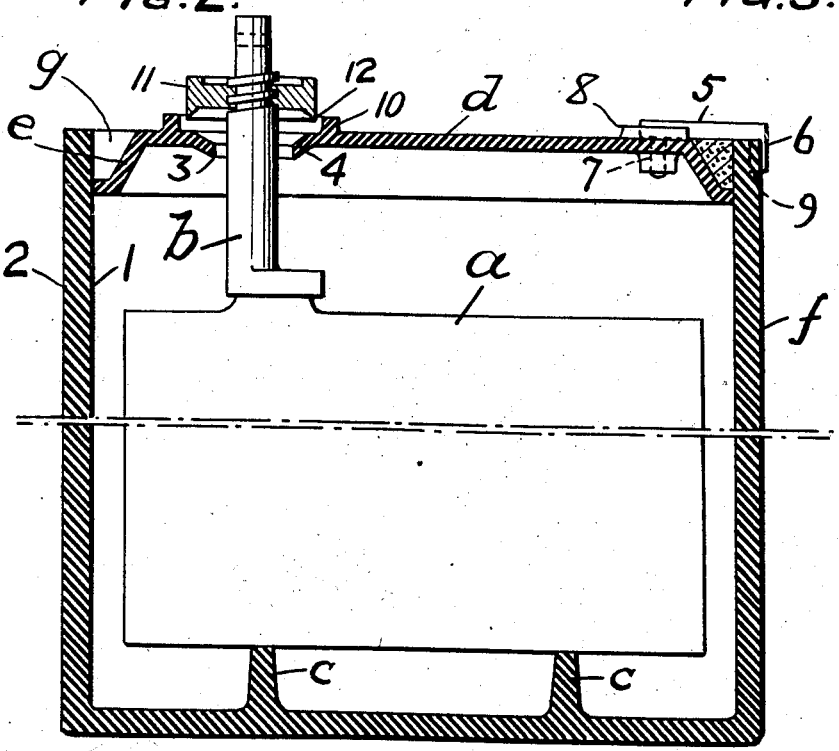
WITNESS:
INVENTOR
Cornelius Ambruster
BY
Augustus B. Stoughton
ATTORNEY.

Patented Nov. 7, 1944

2,362,335

UNITED STATES PATENT OFFICE 2,362,335

VENT STRUCTURE FOR STORAGE BATTERIES

Cornelius Ambruster, Roslyn, Pa., assignor to The Electric Storage Battery Company, Philadelphia, Pa., a corporation of New Jersey Original application June 26, 1940, Serial No. 342,435, now Patent No. 2,328,535, dated September 7, 1943. Divided and this application September 20, 1941, Serial No. 411,669

3 Claims. (Cl. 136—163)

This invention relates to an improved vent construction for a secondary battery and is a division of my co-pending application, Serial No. 342,435, now Patent 2,328,535, dated September 7, 1943.

In accordance with the invention disclosed in my co-pending application, there is provided an improved cover-supporting arrangement for a secondary battery whereby the cover is supported independently of the elements of the battery so that disturbance of the sealing compound, in the event of upward growth of the elements, is opposed.

A specific object of this invention is to provide, in the construction which opposes disturbance of the sealing compound, improved means for venting the battery which means includes an improved construction for preventing emission of electrolyte spray through the vent.

Other objects of the present invention will appear from the following description at the end of which the invention will be claimed.

Generally stated, the invention covered by this application comprises providing openings in the cover of a storage battery for receiving the terminal posts of the battery, which openings have an area greater than the area of the terminal post so that the terminal post is free to move relative to the cover. The opening defined around the terminal post by the excess area of the cover opening relative to the terminal post forms a vent opening, and provided adjacent to this vent opening is improved means for trapping and returning electrolyte spray to the battery jar.

The invention also consists in the improvements to be presently described and finally claimed.

In the following description reference will be made to the accompanying drawing forming part hereof and in which:

Fig. 1 is an elevational view principally in section illustrating a cover structure embodying features of the invention.

Fig. 2 is a partial top or plan view of the same.

Fig. 3 is a sectional view illustrating a detail of construction useful in shipping.

Fig. 4 is a perspective view of one of the supports.

In the drawing, $a$ indicates the element or plate structure provided with a terminal post $b$ and supported on ribs $c$ at the bottom of the battery jar. $d$ indicates a cover downwardly and outwardly flanged at its periphery as indicated at $e$ and the cover fits inside of the jar or container generally indicated at $f$. There is nothing new about the construction as above indicated, and I will now proceed to describe the present invention. The inner face 1 and the outer face 2 of the side wall of the jar are flat. They may, therefore, be produced at comparatively little cost. The hole or opening 3 in the cover is larger than the terminal post $b$ which extends through it and the portion of the cover surrounding the opening 3 is dished downwardly as at 4. 5 is a support provided with a foot 6. A number of these supports 5 in spaced relation are attached to the cover $d$ so as to project beyond its edge and to rest on the top of the side wall of the jar. The feet 6 of the supports 5 engage the outside face of the jar wall and hold it and the cover in fixed relation. The channel $g$ receives sealing compound shown at the right, Fig. 1, and which is not shown at the left for the sake of clearness and the sealing compound is introduced into the space or channel $g$ in the usual way and, since the supports 5 are spaced, they do not interfere with its introduction. As shown, the supports 5 are attached to the cover by rivets 7 and they are arranged in recesses or mortises provided in pads 8 on the cover. The feet 6 are shown arranged as tenons in mortises 9 provided in the outer face of the jar wall, thus avoiding any substantial increase in the outside dimension of the cell. The supports 5 may be made of lead alloy or other suitable material and they may be made integral with the cover or attached thereto. 10 is an upstanding rib on the cover and it surrounds the opening 3. 11 is a canopy shown as mounted on the terminal post 6 and it is provided with a drip skirt 12.

In use, growth or movement in upward direction of the element $a$ is without effect upon the cover and has no tendency to disturb the sealing compound because the terminal post passes through an opening in the cover larger in area than the post itself as clearly shown in Fig. 2. Thus, a vent opening is provided around the post by the opening 3. It is an additional advantage of the construction shown that there are no capillary channels between the post and the cover through which electrolyte might creep and attack the terminal post. The canopy 11 and its drip skirt 12 are located in the path of electrolyte emitted through opening 3 and together with the rib 10 serve to return to the cell any liquid that may have escaped, for example as spray, through the space 3.

Since the cover $d$ and jar are held against relative movement by the supports 5 and their feet 6 and, since the terminal post is free of the cover, tendency to disturb the sealing compound is opposed.

In shipping use may be made of a tapered stopper 13 and washer 14, Fig. 3, in order to steady the element a by engaging the terminal post b, pressure being exerted on the stopper 13 by means of the threaded portion of the post b and canopy 11. In use, however, these elements 13 and 14 are removable as indicated in Fig. 1. The elements 13 and 14 also serve to prevent electrolyte from splashing out of the jar during shipment.

Reference to the drawing shows that the thread on the post b stops at a considerable distance above the cover d, providing a stop or shoulder which limits the downward travel of the element 11 to a position spaced from and above the cover. At the top of the post, the thread is omitted throughout its upward length, providing a portion at the top of the post of somewhat reduced diameter in respect to the post and over which the element 11 is freely movable.

It will be obvious that modifications may be made in details of construction and arrangement without departing from the spirit of the invention which is not limited to such matters or otherwise than the appended claims may require.

I claim:

1. In combination, in a storage battery, a jar containing electrolyte, an element in the jar provided with a terminal post, a cover having an opening larger in area than the area of the cross section of the terminal post and through which the post passes, said cover being annularly ribbed and dished downwardly around the opening, and a canopy mounted on the terminal post above said opening and provided with a drip skirt, whereby spray is directed back into the jar.

2. A storage battery cell comprising a jar, an element supported from the bottom of said jar and having a terminal post, electrolyte in said jar, a cover supported at the top of said jar having an opening through which said post projects, the diameter of said opening being greater than the diameter of said post, a canopy with drip skirt mounted on said post and covering said opening, and a dished cavity provided in the upper surface of said cover and surrounding said opening whereby entrained spray from said electrolyte trapped by said skirt is directed back into the jar.

3. In combination, in a storage battery, a jar containing electrolyte, an element in the jar provided with a terminal post, a cover having an opening larger in area than the area of the cross-section of the terminal post through which the post passes, said cover being provided with an annular downwardly dished cavity around the opening and a canopy mounted on the terminal post above said opening and out of contact with said cover, the outside diameter of said canopy being less than the maximum diameter of said cavity, whereby spray is directed back into the jar.

CORNELIUS AMBRUSTER.